(12) United States Patent  (10) Patent No.: US 7,068,297 B2
Jones et al.  (45) Date of Patent: Jun. 27, 2006

(54) WATERMARKING METHOD FOR MOTION PICTURE IMAGE SEQUENCE

(75) Inventors: Paul W. Jones, Churchville, NY (US); J. Allen Heath, Victor, NY (US); Robert J. Zolla, Rochester, NY (US); Scott P. MacKenzie, Brockport, NY (US); Thomas F. Powers, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/191,113

(22) Filed: Jul. 27, 2005

(65) Prior Publication Data

US 2005/0258256 A1 Nov. 24, 2005

Related U.S. Application Data

(62) Division of application No. 10/778,528, filed on Feb. 13, 2004, now Pat. No. 6,980,226.

(51) Int. Cl.
 *G03G 5/00* (2006.01)
(52) U.S. Cl. ........................ 347/262; 347/264
(58) Field of Classification Search ............... None
 See application file for complete search history.

(56) References Cited

U.S. PATENT DOCUMENTS

| | | | |
|---|---|---|---|
| 5,379,345 A | 1/1995 | Greenberg | |
| 5,646,713 A | 7/1997 | Powers et al. | |
| 5,752,152 A | 5/1998 | Gasper et al. | |
| 5,809,139 A | 9/1998 | Girod et al. | |
| 5,901,178 A | 5/1999 | Lee et al. | |
| 5,991,426 A | 11/1999 | Cox et al. | |
| 6,026,193 A | 2/2000 | Rhoads | |
| 6,044,156 A | 3/2000 | Honsinger et al. | |
| 6,239,818 B1 | 5/2001 | Yoda | |
| 6,438,231 B1 | 8/2002 | Rhoads | |
| 6,449,379 B1 | 9/2002 | Rhoads | |
| 6,611,607 B1 | 8/2003 | Davis et al. | |
| 6,882,356 B1 * | 4/2005 | Roddy et al. ............... 347/224 |
| 6,980,226 B1 * | 12/2005 | Jones et al. ............... 347/225 |
| 2003/0012569 A1 | 1/2003 | Lowe et al. | |
| 2003/0147144 A1 | 8/2003 | Roddy et al. | |
| 2004/0135874 A1 | 7/2004 | Oehlbeck et al. | |
| 2005/0063742 A1 | 3/2005 | Roddy et al. | |

FOREIGN PATENT DOCUMENTS

EP 0 519 391 A1 12/1992

OTHER PUBLICATIONS

J. Lubin et al., "Robust, content-dependent, high-fidelity watermark for tracking in digital cinema," in *Security and Watermarking of Multimedia Contents V*, Proc. SPIE, vol. 5020, Jan. 24, 2003.

* cited by examiner

*Primary Examiner*—Huan Tran
(74) *Attorney, Agent, or Firm*—Peyton C. Watkins

(57) ABSTRACT

A method is provided for applying a watermark pattern along a length of photosensitive medium, the photosensitive medium having a frame pitch in the length direction that is the sum of an image frame height plus an interframe distance. The method exposes watermark tiles contiguously along the length of the photosensitive medium, wherein each watermark tile has a height dimension that is an integral divisor of the frame pitch.

8 Claims, 3 Drawing Sheets

WATERMARKING METHOD FOR MOTION PICTURE IMAGE SEQUENCE

CROSS-REFERENCE TO RELATED APPLICATIONS

This is a divisional of application Ser. No. 10/778,528 filed Feb. 13, 2004, now U.S. Pat No. 6,980,226, titled WATERMARKING METHOD FOR MOTION PICTURE IMAGE SEQUENCE, by Paul W. Jones et al.

Reference is also made to the following commonly assigned U.S. Patent: METHOD AND APPARATUS FOR WATERMARKING FILM to Roddy et al. U.S. Pat. No. 6,882,356, issued on Apr. 19, 2005.

FIELD OF THE INVENTION

The invention relates generally to the field of image watermark application and more particularly relates to a watermarking method for motion picture film.

BACKGROUND OF THE INVENTION

An unfortunate result of technological advances in image capture and reproduction is illegal copying and distribution of image content, in violation of copyright. One solution for counteracting illegal copying activity is the use of image watermarking as a forensic tool. Sophisticated watermarking techniques enable identifying information to be encoded within an image. A watermark can be embedded in the image beneath the threshold of visibility to a viewer, yet be detectable under image scanning and analysis. As just a few examples: U.S. Pat. No. 6,239,818 (Yoda), discloses embedding a pattern in a color print and adjusting cyan, magenta, yellow, black (CMYK) values such that the embedded data matches the color of the surround when viewed under a standard illuminant; commonly assigned U.S. Pat. No. 5,752,152 (Gasper et al.), discloses a pattern of microdots, less than 300 μm in diameter, for marking a photographic print that is subject to copyright.

Illegal copying is a particular concern to motion picture studios and distributors, representing a noticeable source of lost revenue. Watermarking of motion picture images would enable the source of an illegal copy to be tracked and would thus provide a deterrent to this activity. Watermarking techniques for still images and prints, however, may not be well-suited to motion picture film media. An encoded pattern that might not be easily visible within the single image of a print could become visible and annoying if it appears in a sequence of image frames. Moreover, a motion picture watermark must be detectable from a copy, such as a videotape copy, that is typically captured in a temporal sequence that varies from the motion picture projection rate and with varying image resolution, lighting, and filtering. For these and related reasons, motion picture watermarking typically requires a special set of techniques beyond those normally applied for still images.

A number of watermarking methods for motion images have been described in prior art patents and technical literature. Included are methods that apply a spatial-domain or frequency-domain watermark. In either approach, many techniques make use of a pseudo-random noise (PN) sequence in the watermark generation and extraction processes. The PN sequence serves as a carrier signal, which is modulated by the original message data, resulting in dispersed message data (that is, the watermark) that is distributed across a number of pixels in the image. A secret key (termed a "seed value") is commonly used in generating the PN sequence, and knowledge of this key is required to extract the watermark and the associated original message data.

Among prior art patents that address watermarking methods for motion picture image content are U.S. Pat. No. 5,809,139, issued Sep. 15, 1998 to Girod et al., entitled "Watermarking Method and Apparatus for Compressed Digital Video"; U.S. Pat. No. 5,901,178, issued May 4, 1999 to Lee et al., entitled "Post-Compression Hidden Data Transport for Video"; and U.S. Pat. No. 5,991,426, issued Nov. 23, 1999 to Cox et al., entitled "Field-Based Watermark Insertion and Detection". However, the methods disclosed in these patents can be applied only to a digital video data stream and are not directly applicable for watermarking motion picture film.

U.S. Pat. No. 6,026,193, issued Feb. 15, 2000 to Rhoads, entitled "Video Steganography", discloses the basic concept of using multiple watermarked frames from an image sequence to extract the watermark with a higher degree of confidence than would be obtained with only a single frame. U.S. Pat. No. 6,449,379 issued Sep. 10, 2002 to Rhoads, entitled "Video steganography methods avoiding introduction of fixed pattern noise" proposes an improvement to this scheme by changing the PN carrier from frame to frame, for example.

Another approach to applying a watermark to an image sequence is to use a three-dimensional watermark pattern. An example of such a method can be found in a paper by J. Lubin et al, "Robust, content-dependent, high-fidelity watermark for tracking in digital cinema," in *Security and Watermarking of Multimedia Contents V*, Proc. SPIE, Vol. 5020, Jan. 24, 2003. This paper discusses a method for embedding, into successive image frames, a watermark containing low frequency content in both the spatial and temporal dimensions. The method described by Lubin et al. may provide a temporally distributed watermark that is relatively robust. However, this method requires temporal synchronization in order to recover or decode the watermark. That is, some mechanism must be provided that allows indexing of each image frame with a reference frame; a sampling of successive image frames must include this reference in order to allow synchronization of watermarked frames and subsequent decoding. Another limitation is that knowledge of the image content is required for embedding a three-dimensional watermark using this scheme.

The prior art methods cited above provide some amount of watermarking capability, but are not well-suited for printing watermarks onto motion picture film media. This is because each of these methods requires that frame boundaries for each image be known prior to printing the watermark onto the motion picture film medium. That is, the precise location of image frames on the motion picture medium must be known.

For photosensitive media in general, it is known that a watermark encoding can be added to the image frame at the time of printing. However, it is also possible to expose a watermark at other times during processing of the photosensitive medium. For example, as is disclosed in U.S. Patent Application 2003/0012569 entitled "Pre-Exposure of Emulsion Media with a Steganographic Pattern" by Lowe et al., a latent image can be exposed onto the "raw" photosensitive medium itself, at the time of manufacture. Then, when the medium is exposed to form the image, the image frame is effectively overlaid onto the watermark pattern. Such a method is also disclosed in U.S. Pat. No. 6,438,231, entitled "Emulsion Film Media Employing Steganography" to Rhoads. The Rhoads '231 patent discloses this type of pre-exposure of the watermark onto the film emulsion within the frame area of negative film, for example.

It can be appreciated that watermark pre-exposure would have advantages for marking motion picture film at the time of manufacture or prior to exposure with image content. A length of motion picture film could be pre-exposed with unique identifying information, encoded in latent fashion, that could be used for forensic tracking of an illegal copy made from this same length of film. However, prior art watermarking techniques proposed for photosensitive media in general fall short of what is needed for motion picture watermarking. In particular, prior art techniques are not well-adapted for applying a watermark pattern during film manufacture or at any other time prior to exposure of the film with image content. These prior art solutions prove unsatisfactory due, in large part, to these practical considerations:

(i) how motion picture film is imaged and projected in practice; and,
(ii) how the motion picture film surface area or "real-estate" is employed.

Referring to FIG. 1, there is shown a plan view of a typical motion picture print film 10 that is used commercially. A first problem ((i) above) relates to the placement of frames 12 along the length direction L. Frames 12 are dimensioned and spaced with a frame pitch F according to well-established standards followed, for each film type, throughout the motion picture industry. In addition, perforations 14 are made in the film, sized and spaced apart according to rigid standards. For 35 mm film, for example, manufacturers comply with the Society of Motion Picture and Television Engineers (SMPTE) Standard ANSI/SMPTE 139-1996 entitled "SMPTE Standard for Motion-Picture Film (35-mm) Perforated KS". Perforations 14 are formed at the time of film manufacture. Frames 12, however, are not formed until printing at the print lab. Thus, the exact locations of frames 12 along print film 10 are not yet defined at the time of manufacture. The starting position of each frame 12 may be known relative to an index perforation 14; however, it is not known which perforation 14 is used as a reference index until the photosensitive medium is exposed. Even though frames 12 correlate spatially with perforations 14, so that each frame 12 plus interframe space 16 corresponds to an exact number of perforations (typically 4 perforations per frame), the film manufacturer cannot know beforehand where each frame 12 will lie. Thus, unlike the frame-by-frame placement suggested for the broad range of photosensitive media in the Rhoads '231 disclosure, any practical exposure watermarking scheme for motion picture film must apply a contiguous pattern along the full length of film. This means that the watermark pattern will be exposed onto both image frames 12 and interframe spacing 16 areas.

This first concern, then, relates to dimensional characteristics of the watermark. Tiling, in which multiple versions of a watermark are repeated contiguously within the image frame, has been widely recognized as a useful method for encoding the watermark. For example, commonly assigned U.S. Pat. No. 6,044,156 entitled "Method for Generating an Improved Carrier for use in an Image Data Embedding Application" to Honsinger et al. discloses an image watermark scheme using one or more tiles. FIG. 2 shows an example in which multiple watermark tiles 20 are contiguously arranged within image frame 12. (For illustration, only a portion of image frame 12 is shown covered in FIG. 2; in actual practice, the complete area of image frame 12 would have watermark tiles 20.) Watermark tiles 20 can be arranged contiguously in both length L and width W dimensions, extending widthwise between perforations 14 or even between opposite edges of the medium.

Regardless of watermark tile 20 dimensions, the watermark can be detected only when it occurs within image frame 12. However, unless watermark tile 20 is positioned length-wise at the same relative position within successive frames 12, the watermark will effectively "walk" up the displayed motion picture frame when the motion picture image is displayed. While this beat-frequency effect might not be detectable over portions of an image sequence that are themselves visually busy, this "walking" effect could be noticeable and visually objectionable at some frequencies and under some imaging conditions. More importantly, changing the vertical position of watermark tiles 20 from one frame 12 to the next complicates the task of detecting the watermark. This first consideration, then, directly affects the robustness of the watermark. The disclosure of commonly assigned copending application "Method and Apparatus for Watermarking Film" to Roddy et al., U.S. Pat. No. 6,882,356, cited above, recognizes this vertical alignment problem and proposes, as a corrective strategy, sizing the watermark tile height to span a single pitch perforation. While this provides a workable solution in view of problem (i) noted above, it constrains the tile height dimensions to a single perforation pitch, where perforation pitch can be defined as the center-to-center distance between perforations. It can be appreciated that a more flexible solution would eliminate this constraint and allow more flexible sizing of watermark tile height, based on film type, for example.

The second problem ((ii) above) relates to the use of the width W of print film 10. As FIG. 1 shows, the real-estate of the surface of print film 10 is occupied not only by the sequence of frames 12, but also by various audio tracks. An analog sound track 18 is printed between the side edge of frames 12 and perforations 14. A DTS (Digital Theater Systems) soundtrack 26 is encoded between frames 12 and analog sound track 18. A Dolby digital sound track 22 uses areas interspersed between perforations 14, repeated on both sides. Another digital sound track 24, conventionally the standard SDDS (Sony Dynamic Digital Sound) track is encoded along edges of print film 10. Digital sound tracks 22 and 24 are typically duplicated on both sides of print film 10 as indicated by digital sound tracks 22' and 24'. For considerations of watermark application, it is significant to observe that analog sound track 18 and digital sound tracks 22, 24, and 26 are encoded onto print film 10 using exposure to light, in much the same way as frames 12 are exposed. For this reason, any imperfection in imaging quality of print film 10 may also impact audio quality. Film grain, dust, surface imperfections, and other imaging anomalies not only degrade image quality, but may also have an impact on audio quality. For this reason, a watermark that is applied along edges of print film 10 used by audio tracks can potentially degrade the encoded audio signal.

A further complication, related to problem (ii) as given above, is that there is no pre-determined widthwise placement of frames 12 and analog sound track 18 and DTS sound track 26 for unexposed film. As the film is shipped from the manufacturer, one orientation is more likely than its opposite; however, either negative or print film may be rewound before being exposed. Therefore, once print film 10 is manufactured, it cannot be determined in which direction print film 10 will actually be exposed. Thus, it is not known at the time of manufacture whether analog sound track 18 and DTS sound track 26 run along the line of perforations 14 nearest one edge of print film 10 or the other. As is observable in the plan view of FIG. 1, frames 12 are skewed to one side of print film 10 relative to width W, rather than being centered, to accommodate audio sound track 18 and DTS sound track 26.

A practical watermark exposure scheme, then, must address the problems of uncertain placement of frames 12 relative to length L and width W, which directly affects robustness and straightforward detection, and of the need for encoding analog and digital sound tracks 18, 22, 24, and 26. That is, the watermarking scheme that is used must address the problems posed in considerations (i) and (ii) given above. Conventional approaches, such as simply applying a watermark pattern from one edge of film 10 to the other, could yield unsatisfactory results, degrading image quality, degrading audio quality, and compromising the robustness needed. Some improvement over conventional approaches is needed for providing watermark exposure, particularly for motion picture film media, that offers a good measure of robustness without introducing problems related to image and audio quality.

SUMMARY OF THE INVENTION

It is an object of the present invention to provide a method for exposure of a watermark that is particularly suited to the characteristics of motion picture film. With this object in mind, the present invention provides a method for applying a watermark pattern along a length of photosensitive medium, the photosensitive medium having a frame pitch in the length direction that is the sum of an image frame height plus an interframe distance, the method comprising: exposing a plurality of watermark tiles contiguously along the length of photosensitive medium, wherein each watermark tile in the plurality of watermark tiles has a height dimension that is an integral divisor of the frame pitch.

It is a feature of the present invention that watermark tiles are dimensioned based on the frame pitch and perforation scheme used for the motion picture film itself, thereby providing increased robustness for extracting the watermark and eliminating a possible cause of imaging anomalies due to frequency effects.

It is an advantage of the method of the present invention that it provides an exposure scheme for watermarking motion picture film that is suited to how the surface area of motion picture print film is used. Using the method of the present invention, interference of the watermark pattern with encoded audio sound track quality can be minimized or eliminated.

It is a further advantage of the present invention that it provides a flexible method for integrating a watermark pattern onto motion picture film with minimal impact on image quality, where the watermark pattern may be exposed during media manufacturing or at some subsequent time.

It is yet a further advantage of the present invention that it provides a watermarking scheme that can be used with any type of perforated photosensitive medium, as well as with any type of photosensitive medium having periodically spaced notches, indentations, or other features.

It is yet a further advantage of the present invention that it allows application of a watermark without requiring knowledge of where image frames are printed. This allows the method of the present invention to be applied before, during, or after exposure of the photosensitive medium to image content.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
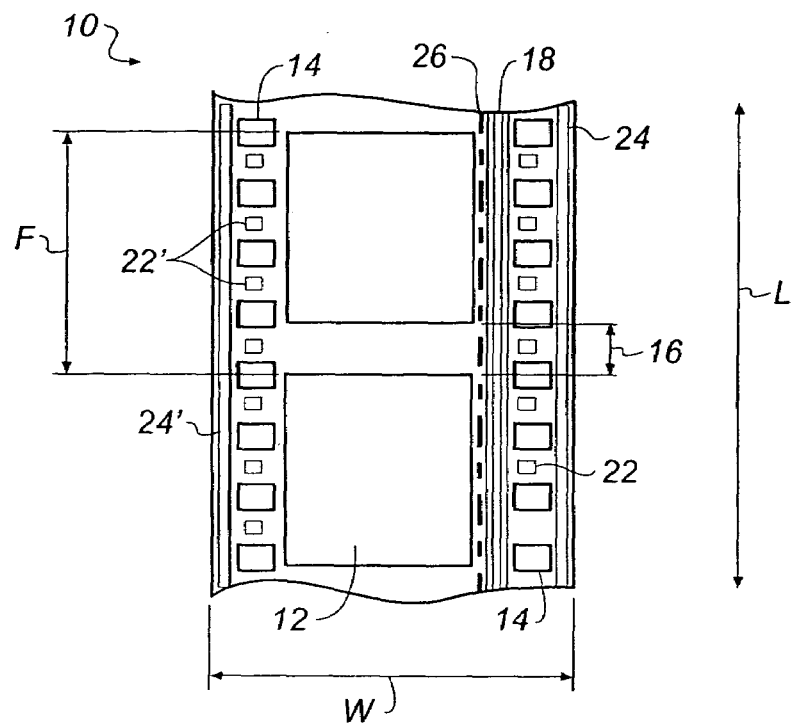
FIG. 1 is a prior art plan view showing a typical arrangement of exposed areas on a motion picture print film.

The present description is directed in particular to elements forming part of, or cooperating more directly with, apparatus in accordance with the invention. It is to be understood that elements not specifically shown or described may take various forms well known to those skilled in the art.

It must be observed that the method of the present invention is directed to a watermarking scheme that is especially well-suited to photosensitive media used for motion picture imaging. In an alternate embodiment, however, as described subsequently, the method of the present invention could be applied to any type of photosensitive medium that allows exposure of a watermark and has some arrangement of perforations or other regularly spaced features.

Watermark Placement—Length Direction

Referring again to FIG. 1 and to problem (i) noted in the background section hereinabove, the inherent dimensional relationships of a motion picture film medium are important to emphasize: image frames 12 are printed at the same size and with consistent frame pitch F along motion picture print film 10, so that frame pitch F, the sum of the height of image frame 12 plus the dimension of interframe space 16, is necessarily the same for any motion picture film of a specific size and format, such as for 35 mm film using the well-known Cinemascope format for example. Referring again to FIG. 2, showing the arrangement of watermark tiles 20 within image frame 12, it can be appreciated that, unless watermark tiles 20 appear at the same relative position within each successive image frame 12, it can be difficult to extract watermark information from a copied motion picture sequence. That is, positional stability of watermark tiles, from one frame 12 to the next, is preferred for ease of watermark extraction.

In addition, it is possible that frequency-related imaging anomalies would be visible due to vertical "walking" of the watermark images if not spatially aligned from one frame 12 to the next frame 12.

Figure 3A:
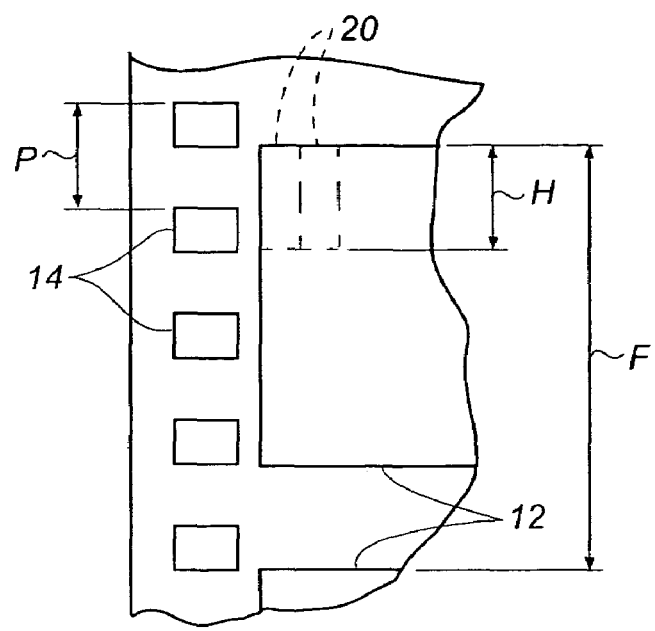
FIGS. 3a and 3b are plan views showing arrangements of watermark tiles that are dimensionally formed according to the method of the present invention; and, FIG. 4 is a plan view showing the use of guard bands for watermark exposure according to the present invention.

To address this problem, the present invention applies a method for forming a contiguous arrangement of watermark tiles along the length L of motion picture film 10 or other photosensitive medium and sizing the height dimension of watermark tiles 20 relative to frame pitch F. Referring now to FIG. 3a, there is shown a length of motion picture print film 10 using watermark tiles 20 having height dimension H equal to perforation pitch P, as is described in the commonly assigned application entitled "Method and Apparatus for Watermarking Film" to Roddy et al., U.S. Pat. No. 6,882,356, cited above. This solution works because frame pitch F is conventionally an integer multiple of perforation pitch P. The more general solution, however, is to require that tile height H of the watermark be an integral divisor of frame pitch F. When this condition is met, the following relationship is satisfied:

$$F/H = \text{an integer} \geq 1 \qquad (\text{eq. 1})$$

Figure 3B:
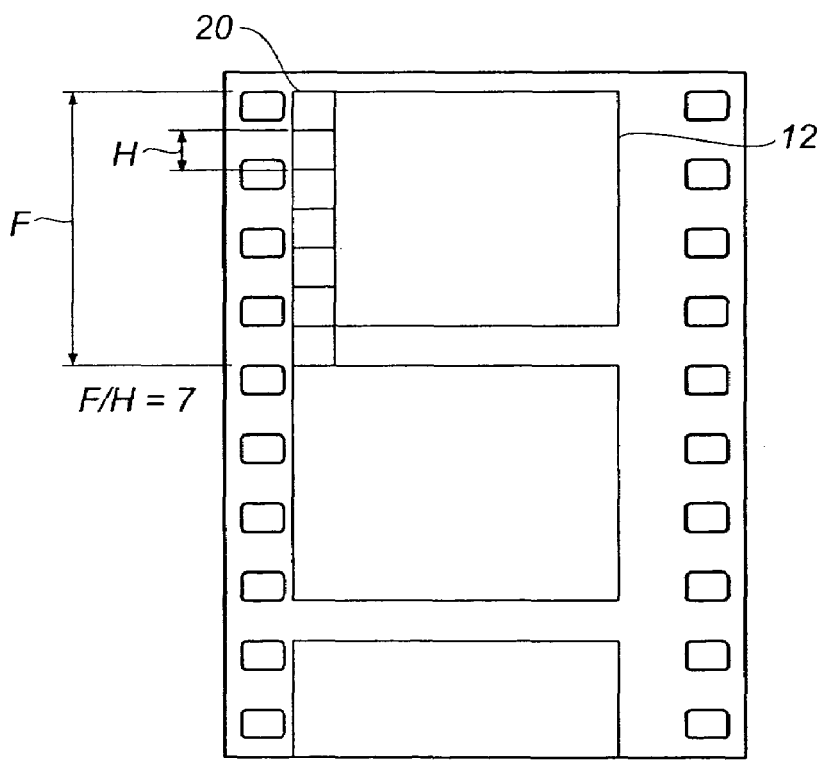

In the example of FIG. 3a, tile height H equals perforation pitch P, so that P/H equals 1. Since frame pitch F is itself an integral multiple of perforation pitch P, the above relationship (eq. 1) is met. FIG. 3b shows an example of the more general case, where tile height H is not necessarily equal to perforation pitch P, but an integral number of watermark tiles 20 span a single frame pitch F.

As is noted in the background section above, frame pitch F is some integral multiplier of perforation pitch P for adjacent perforations 14 as shown in FIG. 3a. By satisfying the relationship of height H of watermark tile 20 to frame pitch F given above (eq. 1), the method of the present invention aligns each watermark tile 20 appropriately within each image frame 12. This ensures that the display of successive image frames 12, as projected, will have the same watermark tile 20 position. This allows watermark tiles 20 to be exposed in a contiguous arrangement along length L of the photosensitive medium. Moreover, the exposure of watermark tiles 20 can be performed before, during, or even after exposure of frame 12 image content. Exposure apparatus for watermark tiles 20 need not be aligned with actual or intended frame 12 placement, since it is only required that the correct dimensions of tile height H be maintained. Note that it is not necessary that the frame edge be aligned with an edge of the tile. Meeting the constraint given above (eq. 1) simply provides that the watermark pattern be in the same spatial position within each frame 12. Tile boundaries themselves are determined during the extraction process, as part of spatial synchronization. In practice, of course, perforations 14 provide a useful reference point for accurate spacing during exposure; particularly where the photosensitive medium may be under varying amounts of tension as it is processed, causing possible stretching of the substrate. However, there is no need to align watermark tiles 20 with any specific point along perforation 14 as long as the dimensional relationship of height H to frame pitch F is maintained.

Watermark Placement—Width Direction

Addressing problem (ii) noted in the background section hereinabove can be slightly more complex. As noted in the earlier discussion relative to FIG. 1, it is not possible to know exactly where image frames 12 with accompanying analog sound track 18 will be placed horizontally, that is, widthwise. Any of the following basic approaches can be employed with respect to the widthwise placement of image frames 12 and accompanying analog sound track 18:

(1) Use the same set of watermark tiles 20 widthwise across the photosensitive medium, between left and right perforations 14, without regard to analog sound track 18 placement. Some impact on audio quality may result, depending on watermark characteristics.

(2) Use a set of watermark tiles 20 that is specifically designed to have minimal impact on the analog audio signal.

(3) Use one or more guard bands 28 as is shown and described below with reference to FIG. 4.

Figure 4:
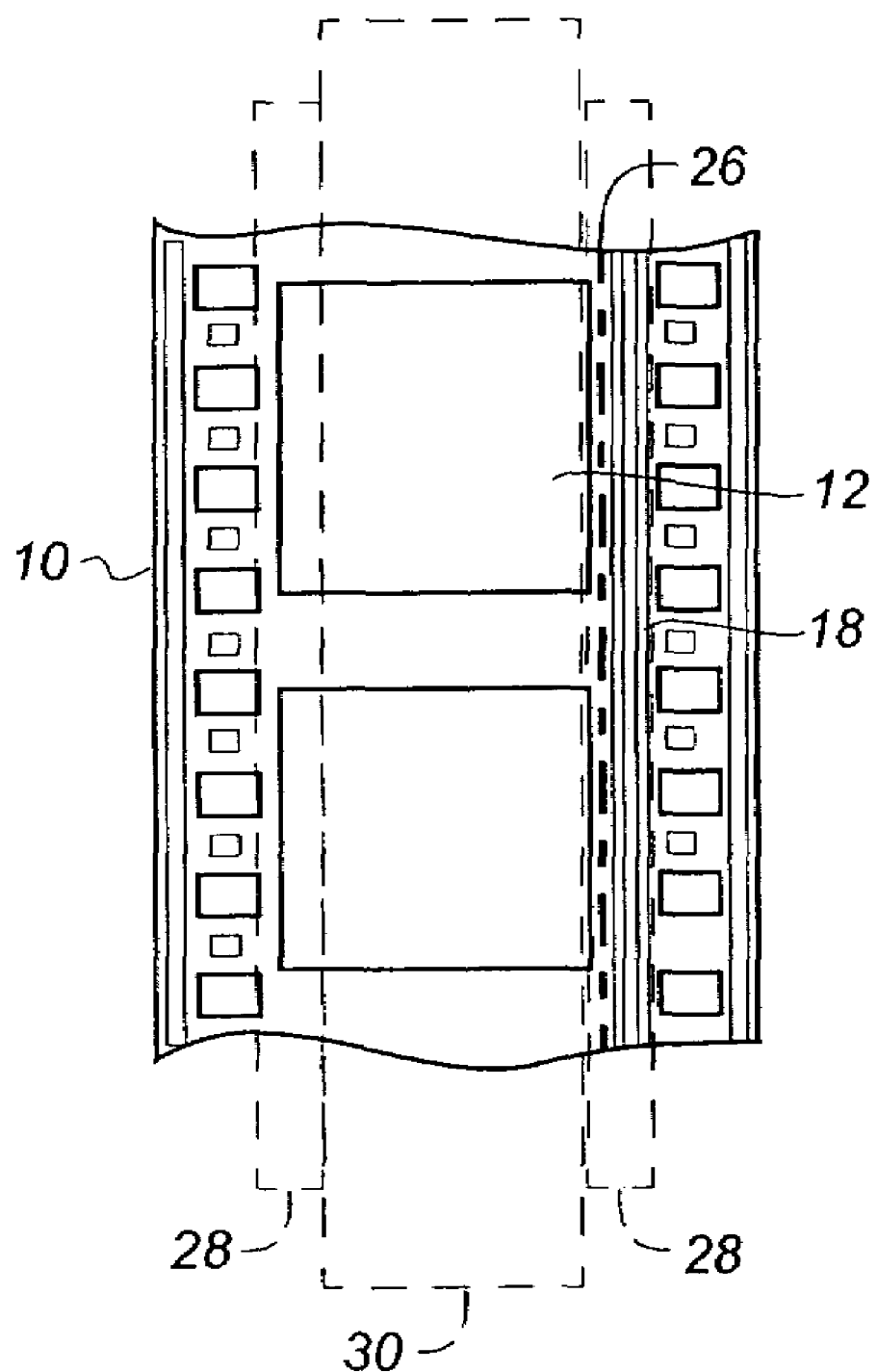

Referring to FIG. 4, different bands of the photosensitive medium are outlined for a short segment of the medium. To allow watermark exposure, the present invention applies a contiguous series of watermark patterns, in the form of watermark tiles 20, along a central watermarking band 30. The area of watermarking band 30 is utilized for image frames 12, whether analog audio sound track 18 and DTS sound track 26 are encoded along perforations 14 to the left or to the right of image frames 12. One or two guard bands 28 may be provided to one or both sides of watermarking band 30. In one embodiment, guard bands 28 are treated as peripheral areas that require some marking in order to match the visibility of patterns within watermarking band 30. Because exposure of the watermark pattern will increase the density and thereby change the color characteristics of the photosensitive medium, guard bands 28 can simply provide a uniform density in one embodiment or can be patterned in such a way that guard band 28 has the same visual appearance as does the portion of the projected image within watermarking band 30. In this way, guard band 28 need not carry the watermark, but could simply have a uniform exposure or could be exposed with a pattern that adds density but is not encoded with a watermark. Experience with pirated copies shows that some part of the image frame 12 border is typically cropped during image capture. Thus, it may be of little consequence if some portion of image frame 12 is without an encoded watermark.

As is noted in the background section above, it is not possible to determine with certainty, at the time of manufacture, the exact orientation of image frames 12 and their accompanying analog audio sound track 18 and DTS sound track 26. However, most motion picture film that is used professionally prints with one orientation, as determined by film packaging. The vast majority of manufactured film is exposed in one orientation; only a minor percentage of this film is likely to be exposed in the alternate orientation, chiefly due to rewinding. Because of this, it may be practical for a watermarking scheme to use only a single guard band 28, exposed on the side of the film that is most likely to contain these audio tracks. Then, should the film happen to be exposed in the opposite orientation, some degradation of audio tracks may occur. The level of degradation in the audio signal will depend on characteristics of the watermark used.

In order to minimize its impact on the encoded audio signals, guard and 28 may be provided with a pattern that adds density but, because the encoded signal is beneath some threshold density or is repeated in a sequence that does not yield an audible frequency, does not add noise if detected within audio sound track 18 or DTS sound track 26. In one embodiment, for example, watermark tiles 20 are exposed only in the yellow dye-producing (that is, blue-sensitive) emulsion layer of print film 10. In this case, guard bands 28 are exposed to produce a correspondingly yellow tint in order to compensate for the color shift caused by watermark exposure within watermarking band 30. Alternately, a pattern could be applied over one or both guard bands 28. However, such a pattern should be designed to have minimal impact on the quality of analog sound track 18 and DTS sound track 26.

Guard bands 28 would not be required in an embodiment that employs watermarking tiles 20 whose pattern is itself not audibly perceptible if imaged in the area of analog audio sound track 18 and DTS sound track 26. A watermark pattern having minimal effect on the encoded audio could be devised. Such a watermark pattern might simply raise DC levels for audio sensing, for example, using a uniform exposure or a patterned exposure that is not detected by audio sensing components that read analog audio track 18 and, therefore, does not generate any measurable noise.

Applying an Audio Watermark

Figure 2:
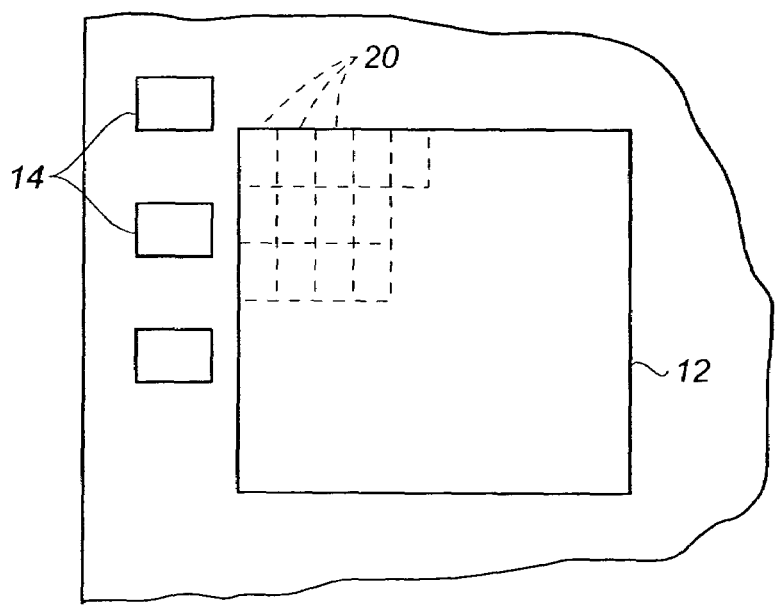
FIG. 2 is a prior art plan view showing a portion of an image frame having an overlaid watermark tile pattern.

In another embodiment, watermarking tiles 20 could also be used to provide a watermark to the audio signal that is encoded in analog sound track 18 (FIG. 1). A number of techniques have been proposed for providing an audio watermark for analog audio signals. For example, U.S. Pat. No. 5,379,345, entitled "Method and Apparatus for the Processing of Encoded Data in Conjunction with an Audio Broadcast" to Greenburg discloses combining an encoded digital data stream as a verification marking for a broadcast audio signal. U.S. Pat. No. 6,611,607, entitled "Integrating Digital Watermarks in Multimedia Content" to Davis et al. discloses the incorporation of digital watermarks in an audio signal for control of processing and copying functions. With the watermarking scheme of the present invention, attributes of watermarking tiles 20 could be designed to impose a detectable watermark pattern within the audio signal, when these watermarking tiles 20 are placed along analog audio sound track 18. In practice, however, this type of watermark could prove to be easy to remove using filters or other mechanisms in the audio path. Watermarking tiles 20 designed for encoding the audio signal may be formed only within guard band 28 or may be formed over some portion or all of the image surface of the photosensitive medium.

As the above description shows, the method of the present invention applies a watermarking pattern that is especially well-suited to the requirements of photosensitive media for motion picture imaging. While this method can have significant value for applying a watermark pattern onto a motion picture print film, it could also be used for watermarking negative film or other imaging media. FIG. 1 and the accompanying text primarily describe conventional 35 mm motion picture film; however, it can be readily appreciated that the present invention applies as well to motion picture photosensitive media of any size or format, such as 16 mm, 65 mm, or 70 mm, for example. Of course, different arrangements of audio tracks are possible, depending on the applicable standard for a type of film. Other types of information can also be encoded outside the area of the image frame, such as bar codes, text, or some other optical encoding. Similar concerns for avoiding watermark interference with or obstruction of the encoded signal would apply for such other encoded information.

In a broader context, the method of the present invention could be applied to photosensitive media used for still imaging. For example, 35 mm negative media is also perforated and typically has image frames positioned relative to film perforations. Thus, it may be useful to apply a watermarking pattern to 35 mm still negative film using the method of the present invention.

Some film types may vary the perforation pitch and have unequal spacing between adjacent perforations, such as APS film uses, for example. However, there is regular spacing of perforations over some interval, and a known frame pitch, allowing the method of the present invention to be used with APS or other still films with unequal perforation-to-perforation distances. Alternately, physical features of the photosensitive medium other than perforations could be used, such as notches or indentations in the film edge, for example. This would allow the method of the present invention to be usable with a number of different types of consumer still imaging film media, as well as microfilm, photosensitive paper, and other products.

A film manufacturer would apply the watermarking method of the present invention as a pre-exposure technique, prior to packaging the photosensitive medium for shipment. However, watermark exposure could alternately be performed by a studio before the negative film is exposed in the camera or by a lab, prior to printing a print film. It must be emphasized that the method of the present invention need not be constrained to pre-exposure. For example, the watermarking tiles could be exposed onto a print film during (substantially simultaneously) or even after exposure to the image content of a frame.

A camera itself could even be provided with an exposure mechanism for encoding a watermark pattern during a film shoot. The same type of components currently used for in-camera date/time stamp exposure could be employed to form a watermark pattern, with the necessary adaptation for exposure, resolution, and other characteristics suitable to watermark application. For example, a contiguous watermark pattern could be exposed within the camera using an arrangement of light-emitting devices such as LEDs in the film path, controlled by camera logic circuitry, using techniques well known to those skilled in the art of camera design.

Those skilled in the art of film manufacture and handling will recognize that the method of the present invention may require that watermark exposure apparatus have periodic synchronization with perforations, since film can stretch with use or stretch due to its winding location on a roll. It may, however, be more practical to expose the watermark pattern of the present invention even before perforating the film medium, provided that stretching tolerances during subsequent film processing are within an acceptable range.

The invention has been described in detail with particular reference to certain preferred embodiments thereof, but it will be understood that variations and modifications can be effected within the spirit and scope of the invention. For example, the method of the present invention could be used in conjunction with any number of prior art techniques that apply a watermark pattern to motion picture content. The watermark pattern, encoded message, or message carrier signal could be changed over a length of motion picture film, using techniques known to those skilled in the art.

As is emphasized in the background description given above, prior art solutions for applying a tiled watermark prove inadequate to meet certain inherent requirements of motion picture media exposure, largely due to the arrangement in which images are formed onto the motion picture medium and due to overall considerations of the use of the surface area or real-estate of the motion picture medium, particularly with respect to added analog and digital audio encoding. While partial solutions have been proposed and may be usable where the exact position of frame 12 is known, the solution of the present invention provides a more complete solution with respect to these inherent problems of motion picture media use. With the solution of the present invention, a watermarking arrangement can be obtained that is well suited for a range of media types, including motion picture media as well as other types of still imaging film and paper, and that can be applied as a pre-exposure marking or applied during or after exposure to image content.

Thus, what is provided is a method for exposure of a watermark pattern onto a length of photosensitive media, such as motion picture film.

PARTS LIST

| | |
|---|---|
| 10 | Print film |
| 12 | Image frame |
| 14 | Perforations |
| 16 | Interframe space |
| 18 | Analog audio sound track |
| 20 | Watermark tiles |
| 22, 22' | Digital sound track |
| 24, 24' | Digital sound track |
| 26. | DTS (Digital Theater Systems) soundtrack |
| 28. | Guard bands |
| 30. | Watermarking band |
| F | Frame pitch |
| H | Tile height |
| L | Length |
| P | Perforation pitch |
| W | Width |

The invention claimed is:

1. A length of photosensitive medium comprising a pattern of watermark tiles, arranged substantially contiguously in a length direction, wherein a frame pitch is substantially an integer multiple of a height of the watermark tiles.

2. A length of photosensitive medium according to claim 1 wherein said photosensitive medium is a motion picture negative.

3. A length of photosensitive medium according to claim 1 wherein said photosensitive medium is a motion picture print film.

4. A length of photosensitive medium according to claim 1 wherein said photosensitive medium is a microfilm.

5. A length of photosensitive medium according to claim 1 wherein said photosensitive medium is a negative used for still imaging.

6. A length of photosensitive medium according to claim 1 wherein said watermark tiles are exposed in at least one color plane.

7. A length of motion picture film comprising:
(a) a pattern of watermark tiles, arranged substantially contiguously along a watermark band in the length direction; and,
(b) at least one guard band alongside the watermark band; wherein the visual density of the guard band approximates the visual density of the watermark band.

8. A length of motion picture film according to claim 7 wherein the frame pitch of the film is an integer multiple of the height of one watermark tile.

* * * * *